Figure 1:
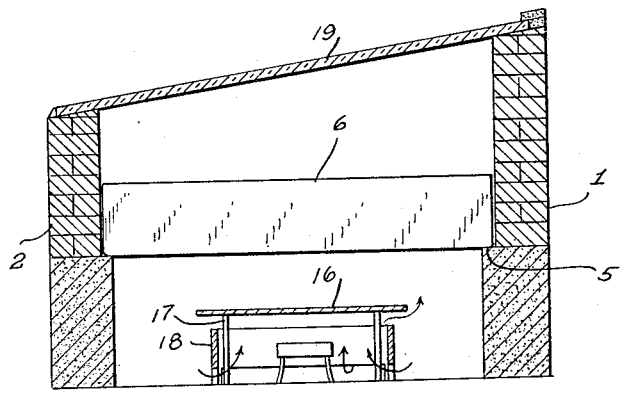

April 28, 1931.  C. M. WATT  1,802,452

HOT FRAME

Filed Feb. 25, 1928

INVENTOR
Charles M. Watt
BY
ATTORNEYS

Patented Apr. 28, 1931

1,802,452

UNITED STATES PATENT OFFICE

CHARLES M. WATT, OF GREENWICH, CONNECTICUT

HOT FRAME

Application filed February 25, 1928. Serial No. 257,001.

My invention relates to a hot frame and my object is to improve upon constructions heretofore known.

In the ordinary hot frame for growing vegetables, flowers and the like, it has been usual to employ below the growing trays a bed of manure, such as horse manure, etc., which is allowed to rot and so generate the necessary heat. This is objectionable for various reasons. It is difficult to obtain manure nowadays and in order to keep up the heat, it must frequently be watered and tended. Even with the best of care, the temperature may rise so high as to wilt or destroy the seedlings or it may drop so low as to prevent germination or injure the growing plants. Other objections are inherent in the use of manure.

By my invention, I provide a construction which will obviate these difficulties and allow an even temperature to be maintained at all times.

I am aware that my invention may be embodied in various forms.

Figure 2:
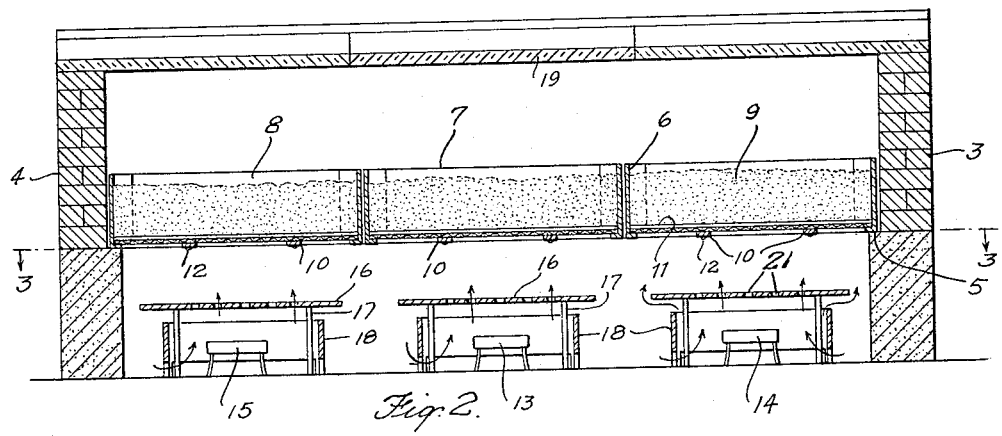

In the drawings which illustrate a preferred embodiment,

Figure 1 is a transverse section partially in elevation;

Fig. 2 a longitudinal section and

Figure 3:
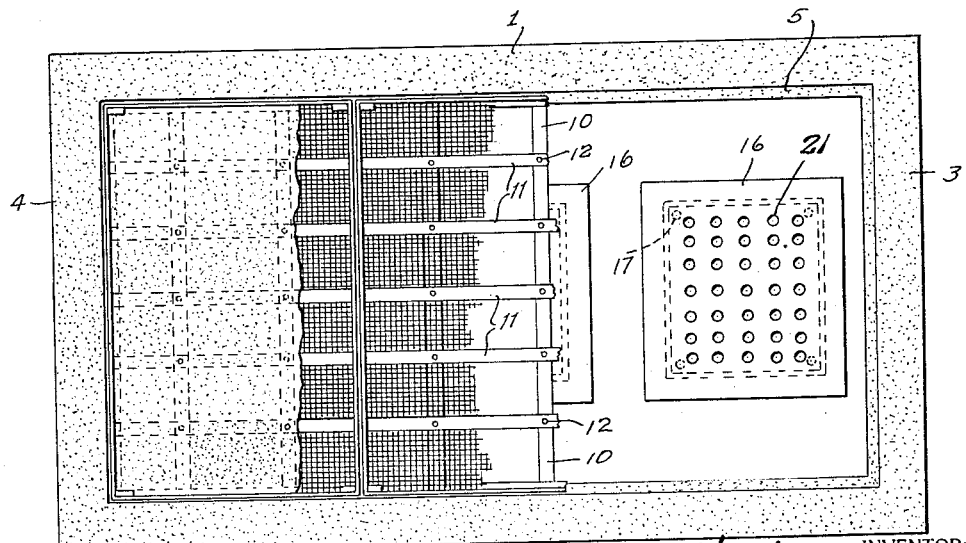

Fig. 3 a plan view on the dotted line 3—3 of Fig. 2, partially broken away.

The frame comprises enclosing walls 1, 2, 3, 4, which may be of any desired construction. In the present instance, I have shown the bottom portion of cement and the upper portion of brick. In the frame are a plurality of trays for holding the earth and which are removably supported therein in any desired manner, such, for example, by resting upon a ledge or step indicated by 5. These trays are indicated by 6, 7 and 8. They may be of various constructions. Preferably, they are shallow boxes provided with perforated bottoms. These bottoms may be and preferably are made of gauze wire of such fine mesh that the earth 9, in which the seeds or seedlings are to be planted, will not readily pass through. They may be constructed in various ways, but I prefer to provide cross-supports, such as 10, underneath the gauze and over cross-supports 11 above the gauze, which may be fastened together by suitable bolts 12 or otherwise so as to hold the gauze firmly in position and give sufficient support to it.

A space underneath the trays is left and in this space I locate the heaters 13, 14, 15, in such number as may be necessary, preferably one under each tray. These heaters may be of various construction, either electric, or other, as may be desired, but an electric heater of any well known form I deem preferable, as the temperature may easily be controlled in well known ways and the control of the temperature is affected without changing the composition of the atmosphere. A specific construction of the heater or its connection to the source of electricity is not shown, as these are details which are well known.

If the bottom of the tray were exposed directly to the heat, some parts of it would get more heat than others and it would not be desirable in other respects. I have, therefore, provided above each heater and between it and the tray a heat distributing means which in the present instance is in the form of a plate 16, which will deflect the heat laterally, thus distributing the heat substantially equally over the bottom of the tray. The convection currents are in part indicated by the arrows on Figs. 1 and 2. It will be observed that some of the convection heat is deflected beneath the plates 16 and around the sides and ends of these plates, while a portion of the convection heat is allowed to pass through the holes 21 and thus directly up against the trays. These plates 16 may be supported in any desired manner, such, for example, as being provided with legs 17. A baffle, such as 18, which is in effect a wall surrounding the heater, may be provided, if desired. 19 represents the usual glass over the top of the frame.

I am aware that various modifications may be made without departing from the scope of my invention.

What I claim is:

1. A hot frame comprising a permeable bed for supporting soil for growing plants, means defining an enclosed air space beneath said permeable bed, a heating means adapted to be raised to a radiant temperature without substantially changing the composition of the atmosphere, positioned at a distance beneath said permeable bed and so as to cause convection currents to pass thereover, and heat distributing means adapted to intercept the greater part of the radiated heat and convection currents from said heating means and to distribute them to substantially every part of the bed.

2. A hot frame as defined in claim 1 in which the distributing means is adapted to distribute the heat substantially uniformly over the under surface of the permeable beds.

3. A hot frame as defined in claim 1 in which the heating means comprises a plurality of units uniformly distributed with relation to the under surface of said beds.

4. A hot frame as defined in claim 1, in which the means for distributing heat comprises perforated plates adapted to permit passage of a regulated proportion of the radiated heat and convection currents but to deflect other convection currents to and absorb other radiated heat and conduct it to other parts of the distributing means whereby substantially uniform heating of the beds is attained.

5. A hot frame as defined in claim 1 in which a substantially vertical baffle surrounds each unit of the heating means whereby to increase the convection currents over the heating means and subject the heated atmosphere to more perfect control of the distributing means.

Signed at Greenwich, Connecticut, this 18th day of February, 1928.

CHARLES M. WATT.